(12) United States Patent
Dosluoglu et al.

(10) Patent No.: US 9,369,040 B1
(45) Date of Patent: Jun. 14, 2016

(54) LOAD AWARE VOLTAGE REGULATOR AND DYNAMIC VOLTAGE AND FREQUENCY SCALING

(71) Applicant: Endura Technologies LLC, San Diego, CA (US)

(72) Inventors: Taner Dosluoglu, New York, NY (US); Anatoly Gelman, San Diego, CA (US)

(73) Assignee: Endura Technologies LLC, San Diego, CA (US)

( * ) Notice: Subject to any disclaimer, the term of this patent is extended or adjusted under 35 U.S.C. 154(b) by 0 days.

(21) Appl. No.: 14/636,022

(22) Filed: Mar. 2, 2015

(51) Int. Cl.
*H02M 3/156* (2006.01)
*H02M 3/158* (2006.01)
*H02M 3/157* (2006.01)
*G06F 1/32* (2006.01)
*H02M 1/00* (2006.01)

(52) U.S. Cl.
CPC .............. *H02M 3/156* (2013.01); *G06F 1/324* (2013.01); *H02M 3/157* (2013.01); *H02M 3/158* (2013.01); *H02M 2001/0019* (2013.01); *H02M 2003/1566* (2013.01)

(58) Field of Classification Search
CPC ............ H02M 2001/0019; H02M 3/156; H02M 3/157; H02M 3/158; H02M 2003/1566; G06F 1/3203; G06F 1/324; G06F 1/3296
See application file for complete search history.

(56) References Cited

U.S. PATENT DOCUMENTS

| | | | | |
|---|---|---|---|---|
| 6,788,035 | B2* | 9/2004 | Bassett | H02J 1/102 323/272 |
| 6,975,494 | B2* | 12/2005 | Tang | G06F 1/26 323/272 |
| 9,065,339 | B2* | 6/2015 | Pierson et al. | |
| 2005/0184712 | A1* | 8/2005 | Wei et al. | 323/282 |
| 2007/0247216 | A1* | 10/2007 | Kolinummi et al. | 327/544 |
| 2010/0315057 | A1* | 12/2010 | Zambetti | 323/284 |
| 2011/0241640 | A1* | 10/2011 | Qiu et al. | 323/283 |
| 2012/0176820 | A1* | 7/2012 | Li et al. | 363/21.12 |
| 2012/0229104 | A1* | 9/2012 | Pierson et al. | 323/234 |
| 2013/0238309 | A1* | 9/2013 | Ting et al. | 703/21 |
| 2014/0043008 | A1* | 2/2014 | Babazadeh et al. | 323/304 |
| 2014/0139198 | A1* | 5/2014 | Manlove et al. | 323/282 |
| 2014/0266122 | A1* | 9/2014 | Zhu et al. | 323/284 |
| 2014/0317422 | A1* | 10/2014 | Rosenzweig et al. | 713/300 |

* cited by examiner

*Primary Examiner* — Fred E Finch, III
(74) *Attorney, Agent, or Firm* — Klein, O'Neill & Singh, LLP (57) ABSTRACT

A voltage regulator and/or associated circuitry provides an indication of average current consumed or drawn by a load, level and magnitude of transient events, and regulation efficiency. A dynamic voltage and frequency scaling governor makes use of the indication of average current consumed or drawn by the load, level and magnitude of transient events, and regulation efficiency to help optimize operation of the load, with respect to power and/or performance.

15 Claims, 11 Drawing Sheets

LOAD AWARE VOLTAGE REGULATOR AND DYNAMIC VOLTAGE AND FREQUENCY SCALING

BACKGROUND OF THE INVENTION

The present invention relates generally to voltage regulation for semiconductor circuits, and more particularly to voltage regulation operations using load and regulator efficiency information.

Regulated DC-DC voltage converters generally provide for regulated power to operational circuitry, for example integrated circuits in semiconductor devices used in a wide variety of applications. Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

Varying voltages supplied to operating circuits and/or varying a clock rate of clocks which govern timing of operations of the operating circuits may assist in reducing power consumption by the operating circuits. This may be performed dynamically during circuit operations, and may be based on amount of workload, nature of workload, as well as operating circuit temperature information, for example from process, variation, and temperature sensors, and information relating to whether circuit operation should be optimized for performance or efficiency. Unfortunately, such dynamic voltage and frequency scaling operations may not sufficiently provide for a combination of desired circuit operation and power consumption control under varying operating conditions.

BRIEF SUMMARY OF THE INVENTION

Aspects of the invention relate to load aware dynamic voltage and frequency scaling and load aware voltage regulators. In some aspects of the invention a dynamic voltage and frequency scaling (DVFS) governor is provided an indication of average current usage for a load and efficiency information of a voltage regulator supplying power in a lossy power delivery network. In some embodiments the DVFS governor is implemented as program instructions, for example in a form of a software agent, executing on an application processor, utility processor, or dedicated processor/microcontroller. In some embodiments the DVFS governor is implemented as circuitry, as part of a dedicated custom hardware engine for example.

One aspect of the invention provides a system useful in provision of power to integrated circuitry forming a load, comprising: a voltage regulator configured to provide regulated power to a load in accordance with a requested voltage level, the voltage regulator including circuitry for determining a signal indicative of average current provided to a load; a dynamic voltage and frequency scaling (DVFS) governor configured to determine a voltage to be applied to the load and a frequency of a clock signal to be used by circuitry of the load, the DVFS governor configured to adjust at least one of the voltage to be applied to the load and the frequency of the clock signal to be used by circuitry of the load based on the signal indicative of average current provided to the load.

Another aspect of the invention provides a system useful in provision of power to integrated circuitry forming a load, comprising: an automatic transient control (ATC) circuit configured to provide regulated power to a load in accordance with a commanded voltage signal, the ATC circuit including circuitry for providing a signal indicative of number of ATC activations; a voltage regulator configured to provide the commanded voltage signal in accordance with a signal indicative of current ramp rate target, the voltage regulator including circuitry for determining a signal indicative of average current provided to the ATC circuit; a dynamic voltage and frequency scaling (DVFS) governor configured to determine a voltage to be applied to the load and a frequency of a clock signal to be used by circuitry of the load, the DVFS governor configured to adjust at least one of the voltage to be applied to the load and the frequency of the clock signal to be used by circuitry of the load based on the signal indicative of number of ATC activations.

These and other aspects of the invention are more fully comprehended upon review of this disclosure.

DETAILED DESCRIPTION

Figure 1:
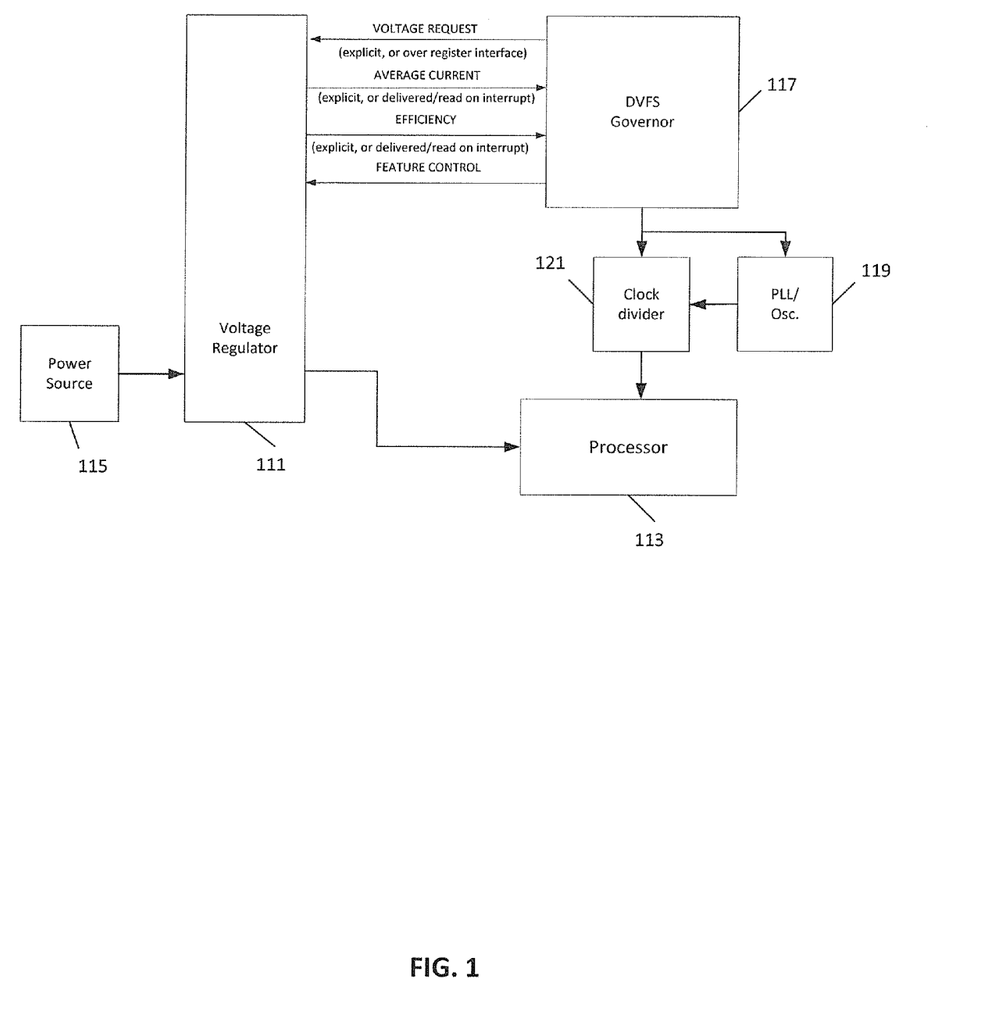
FIG. 1 is a block diagram of a system including voltage regulation related functions in accordance with aspects of the invention.

FIG. 1 is a block diagram of a system including voltage regulation related functions in accordance with aspects of the invention. In FIG. 1 a voltage regulator 111 receives power from a power source 115, and supplies regulated power to a load, which is shown as a processor 113 in FIG. 1. The power source 115 may be a utility power source, but is generally a battery. In some embodiments the battery, voltage regulator, and processor are all part of one device, for example a cellular or smart telephone device or other portable computer device.

Power consumption by the processor is modulated by a dynamic voltage and frequency scaling (DVFS) governor 117. Power consumed by the processor is generally a function of frequency of operations performed by the processor, and voltage levels applied to the processor. Reduction of frequency of clock signals supplied to the processor generally reduces power consumed over a period of time by the processor, as does reduction in voltage levels applied to the processor. Generally, the DVFS governor determines a target voltage level and target frequency of operations, which may be considered a target voltage, frequency operating point, or simply a voltage, frequency set or operating point. The target voltage, frequency operating point may be based on power requirements of the processor, amount of processing performed by the processor, nature of processing performed by the processor, and/or other factors. The DVFS governor, responsive to or in view of various conditions for example, may request, or in some embodiments command, the voltage regulator to provide power to the processor at lower voltage levels, and may reduce (or increase) frequency of clock signals governing frequency of operations performed by the processor. The DVFS governor may, for example, command a phase-locked loop (PLL) or oscillator 119, which may be a voltage controlled oscillator (VCO), to provide clock signals at a lower frequency, or similarly command a clock divider 121, receiving clock signals from the PLL or oscillator, to use a different divisor in dividing clock signals supplied by the PLL or oscillator.

In various embodiments, the voltage regulator may provide the DVFS governor an indication of average current supplied by the voltage regulator and an indication of efficiency of the voltage regulator, to assist the DVFS governor in determining voltage requests and/or clock frequency commands.

The indication of average current may be an indication of average current over a short period of time, for example one or a predefined number of clock periods, which in some embodiments effectively provide instantaneous current supplied by the voltage regulator. The voltage regulator may, for example, in some embodiments include circuitry for determining an indication of inductor current for an output inductor of the voltage regulator, and also include circuitry for averaging the inductor current over a few clock cycles, or a few switching cycles in some embodiments.

In some embodiments the voltage regulator is a switching converter, for example connecting an output circuit to a higher voltage using a high side (HS) switch and to a lower voltage, for example ground, using a low side (LS) switch. In such embodiments, the voltage regulator may include circuitry for determining efficiency based on a ratio of HS switch to LS switch operation compared to a ratio of input voltage to the voltage regulator and output voltage of the voltage regulator. For example, in some embodiments it may be assumed that efficiency of the voltage regulator may be indicated by $$V_{in}*(HS_{time}/LS_{time})*\text{efficiency}=V_{out},$$

where efficiency is in terms of a percentage.

In some embodiments the DVFS governor stores a value indicative of average current for a time period in which the processor is idle or not powered, which in some embodiments is at a boot time of the device, with the stored value stored as a value indicative of leakage current of the load. In some embodiments the DVFS governor determines a value indicative of dynamic current, which is average current then being provided by the voltage regulator to the processor, minus the leakage current. In some such embodiments, the DVFS governor additionally uses the indication of dynamic current in making determinations as to voltage to be applied to the processor or frequency of clock signals to be used by the processor. In some embodiments the DVFS governor reduces frequency of the clock signals to be used by the processor if the indication of dynamic current is below a predetermined value, although in some such embodiments this is only done if a power setting for the device indicates a preference for power efficiency rather than performance. In some embodiments the DVFS governor increases frequency of the clock signals to be used by the processor if the indication of dynamic current is below a predetermined value, although in some such embodiments this is only done if a power setting for the device indicates a preference for performance rather than power efficiency.

Figure 2:
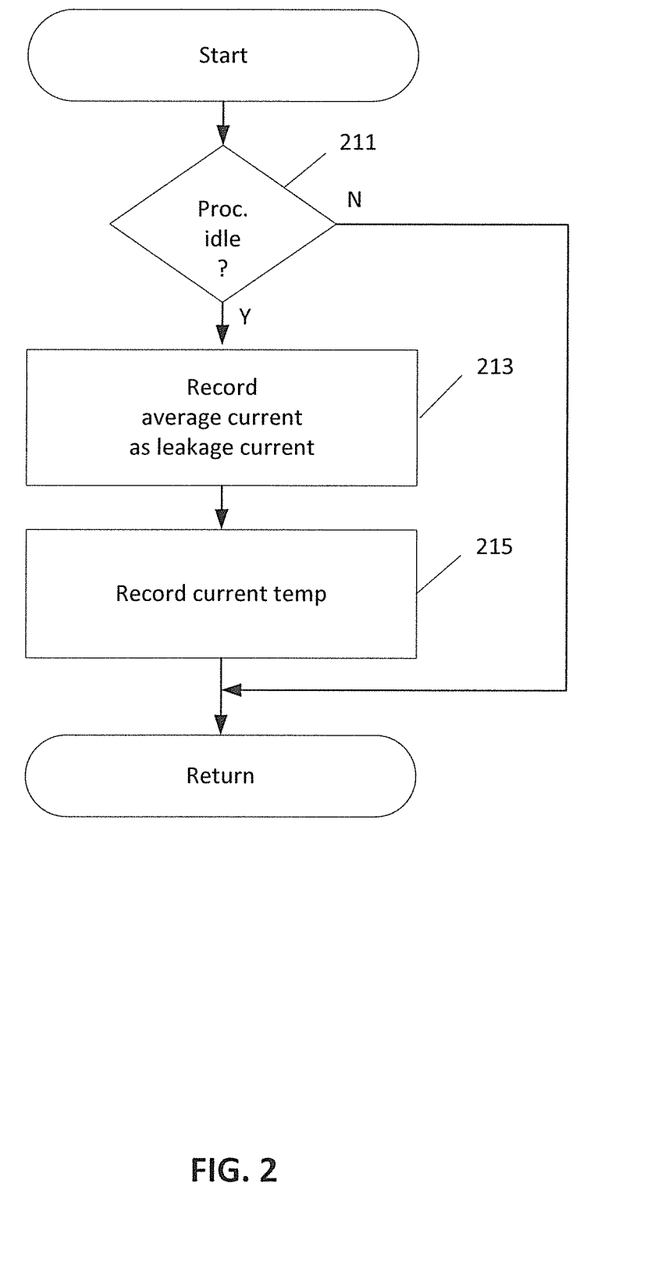
FIG. 2 is a flow diagram of a process for determining leakage current functions in accordance with aspects of the invention.

FIG. 2 is a flow diagram of a process for determining leakage current information in accordance with aspects of the invention. In some embodiments the process is performed by the system of FIG. 1, or portions of the system of FIG. 1. In some embodiments the process is performed by a DVFS governor, for example the DVFS governor of FIG. 1.

In block 211 the process determines if a load, for example an application processor of a device, is idle. In some embodiments the load is idle at a boot of the device. In some embodiments the load is idle when commanded to an idle state by other components of the device. In some embodiments the DVFS governor is provided a signal indicating the load is idle by another component of the device, for example by way of a system-on-chip (SOC) command.

If the load is idle, the process continues to block 213, otherwise the process returns.

In block 215 the process records a value indicative of average current as a leakage current value. In some embodiments the value indicative of average current is a value indicative of output inductor current of a voltage regulator. In some embodiments the average current is an average current over one, or a few, switching cycles of the voltage regulator. In some embodiments the value indicative of the average current is provided to the DVFS governor by a voltage regulator. In some embodiments the value indicative of the average current is read from a register by the DVFS governor, with the register set, for example, by the voltage regulator.

In block 215 the process records a value indicative of current temperature. In some embodiments the value indicative of current temperature is a valued determined by a process-voltage-temperature sensor. In some embodiments the process stores the value indicative of current temperature in association with the value indicative of leakage current.

The process thereafter returns.

Figure 3:
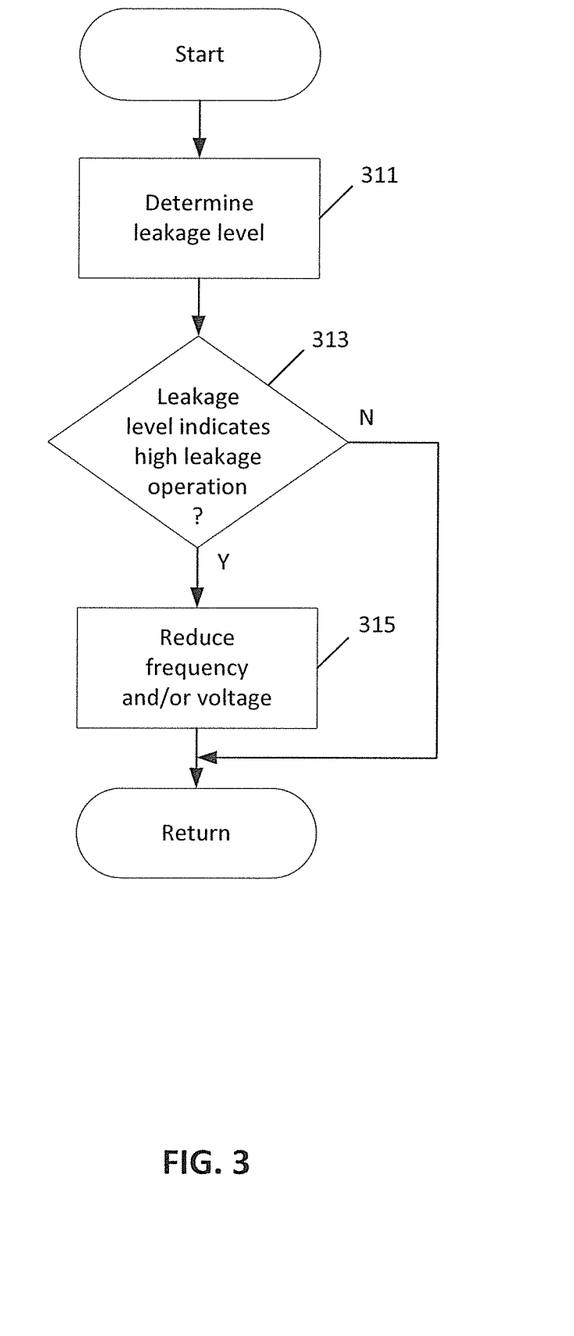
FIG. 3 is a flow diagram of a process useful in performing DVFS operations in high current leakage conditions in accordance with aspects of the invention.

FIG. 3 is a flow diagram of a process useful in DVFS operations in a high current leakage conditions in accordance with aspects of the invention. In some embodiments the process is performed by the system of FIG. 1, or portions of the system of FIG. 1. In some embodiments the process is performed by a DVFS governor, for example the DVFS governor of FIG. 1.

In block 311 the process determines a leakage level. In some embodiments the leakage level is a value indicative of current or power lost due to leakage. In some embodiments the leakage level is a leakage percentage. In some embodiments the leakage percentage is expressed as a percentage of average current or average power lost due to leakage. In some embodiments the process determines the leakage percentage based on a stored value indicative of leakage current and a value indicative of average current. In some embodiments the process determines the leakage percentage based on a ratio of leakage current and average current. In some embodiments the process determines the leakage percentage based on a ratio of leakage current, adjusted by a factor based on a difference between a then current temperature of the system and a temperature at which a leakage current was determined, and average current.

In block 313 the process determines if the leakage level indicates high leakage operation of the system. In some embodiments the process determines that the leakage level indicates high leakage operation of the system if the leakage percentage is above a predetermined percentage. In some embodiments the predetermined percentage is a value stored in a register. In some embodiments the process determines that the leakage percentage indicates high leakage operation of the system if the leakage percentage is above a predetermined percentage and average current is above a predetermined amount.

In block 315 the process modifies an aspect of operation of the system with respect to voltage commanded to be applied to a load. In some embodiments the aspect of the operation of the system is a clock frequency of a clock signal used in controlling timing of operations of circuitry of the load. In some such embodiments, and as illustrated in FIG. 3, the process reduces a frequency of the clock signal and/or voltage to be applied to the load. In some embodiments the process restricts frequency of the clock signal and/or voltage applied to the load (which together may be considered a voltage, frequency set point) to below predetermined levels. In some embodiments the process restricts the voltage, frequency set points to below (or within) predefined combinations of values. In some embodiments, the process reduces the frequency of the clock signal if the system is set, for example by a user setting, for optimization of power efficiency of the system. In other such embodiments the process increases the frequency of the clock signal. In some such embodiments the process increases the clock frequency if the system is set for optimization of performance of the system.

The process thereafter returns.

Figure 4A:
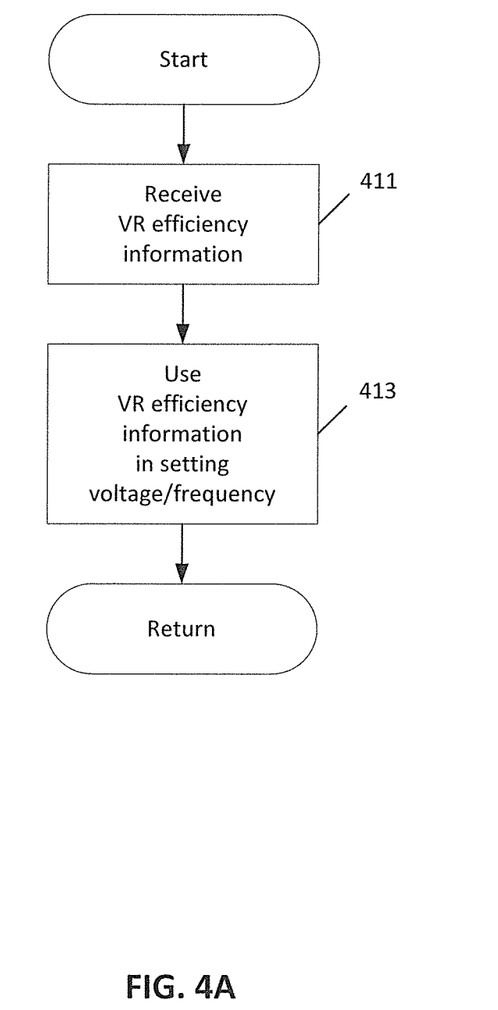
FIG. 4A is a flow diagram of a process useful in configuring DVFS governor functions in accordance with aspects of the invention.

FIG. 4A is a flow diagram of a process useful in configuring DVFS governor functions in accordance with aspects of the invention. In some embodiments the process is performed by the system of FIG. 1, or portions of the system of FIG. 1. In some embodiments the process is performed by a DVFS governor, for example the DVFS governor of FIG. 1.

In block 411 the process receives voltage regulator efficiency information. In some embodiments the voltage regulator efficiency information is provided by a voltage regulator configured, in addition to regulating voltage, to determine an indication of efficiency of the voltage regulator. In some embodiments the voltage regulator efficiency information indicates efficiency of a voltage regulator in converting an input power supply voltage to a voltage to be applied to a load. In some embodiments the voltage regulator is a switching converter including a high side switch coupling a node to a higher input voltage and a low side switch coupling the node to a lower voltage (which may be ground), and the efficiency information is based on a ratio of time of activation of the high side switch to the time of activation of the low side switch and a ratio of the output voltage to the input voltage.

In block 413 the process uses the voltage regulator efficiency information in setting a requested output voltage and a clock frequency for a clock signal to be used by the load in performing operations. In some embodiments the process uses a lookup table which correlates a current voltage regulator efficiency with a preferred output voltage and/or clock frequency. In some embodiments the process additionally uses information regarding dynamic current utilized by the load in setting the requested output voltage and clock frequency for the clock signal. In some embodiments the process restricts voltage, frequency set points to within, or below, predetermined ranges or values.

The process thereafter returns.

Figure 4B:
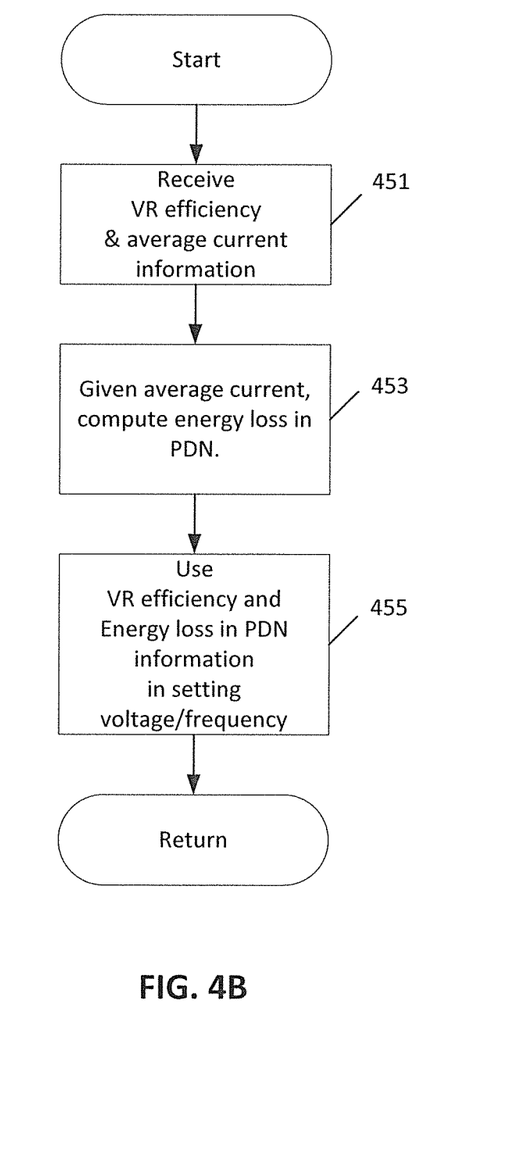
FIG. 4B is a flow diagram of a process useful in configuring DVFS governor functions in accordance with aspects of the invention.

FIG. 4B is a flow diagram of a process useful in configuring DVFS governor functions in accordance with aspects of the invention. In some embodiments the process is performed by the system of FIG. 1, or portions of the system of FIG. 1. In some embodiments the process is performed by a DVFS governor, for example the DVFS governor of FIG. 1.

In block 451 the process receives voltage regulator efficiency information and average current information. In some embodiments the voltage regulator efficiency information is provided by the voltage regulator. In some embodiments the average current information is provided by the voltage regulator. In various embodiments the average current is average current provided to a load. In some embodiments average current is average current through one or more inductors of the voltage regulator. In some embodiments the average current information is average current over a predetermined time period. In some embodiments the predetermined time period is a single switching cycle of the voltage regulator. In some embodiments the predetermined time period is a predefined number of switching cycles, which may be a plurality of switching cycles.

In block 453 the process determines a value indicative of energy loss in a power distribution network (PDN). In most embodiments the energy loss is determined using the average current information. In some embodiments the value indicative of energy loss in the PDN is based on the average current information and a value indicative of impedance of the PDN. The impedance of the PDN may be indicated by a value, for example stored in a register in some embodiments. In some embodiments the energy loss is determined by subtracting a leakage current value from a value indicative of average current. In some embodiments the determination of energy loss includes determining a percentage of the value indicative of average current.

In block 455 the process sets a voltage, frequency operating point for a load using the voltage regulator efficiency information and the energy loss in the PDN information.

The process thereafter returns.

Figure 5:
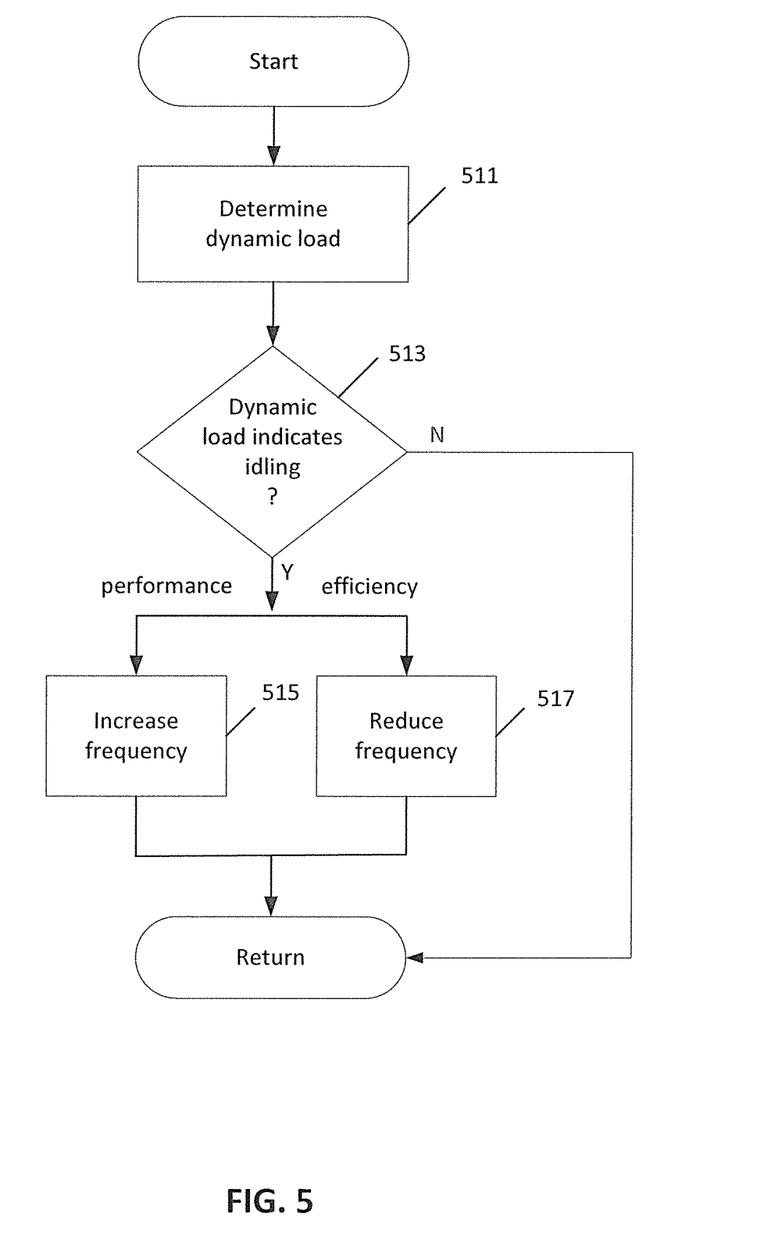
FIG. 5 is a flow diagram of a process useful in operating a DVFS governor under dynamic loading conditions in accordance with aspects of the invention.

FIG. 5 is a flow diagram of a process useful in operating a DVFS governor under dynamic loading conditions in accordance with aspects of the invention. In some embodiments the process is performed by the system of FIG. 1, or portions of the system of FIG. 1. In some embodiments the process is performed by a DVFS governor, for example the DVFS governor of FIG. 1.

In block 511 the process determines a dynamic load. The dynamic load may be, for example, an indication of instantaneous current consumed by a load. In some embodiments the process determines dynamic current as an average current minus a leakage current. The average current may be a near instantaneous current of an output inductor of a switching voltage regulator. The leakage current may be the average current as measured under a no load condition. In some embodiments the leakage current is measured with a system at a first temperature, with a value used for leakage current during operation of the load adjusted for changes in temperature of the system.

In block 513 the process determines if the dynamic load indicates idling by the load. The dynamic load may indicate idling by the load if the dynamic load is below a predetermined value. In some embodiments the predetermined value may be different depending on a commanded state for the load. In some embodiments idling by the load may occur, for example, if the load is delaying operations while waiting for signals from a subsystem of a different power domain or island.

If the process determines that the dynamic load indicates that the load is not idling, the process returns. Otherwise, the process continues to block 515 if the system is set to optimize performance, or to block 517 if the system is set to optimize power efficiency.

In block 515 the process increases a frequency of a clock signal used by the load in performing operations. Increasing the frequency of the clock signal used by the load may allow the load, for example once the load receives signals from other subsystems, to more quickly perform desired functions. The process thereafter returns.

In block 517 the process decreases a frequency of a clock signal used by the load in performing operations. The process thereafter returns.

Figure 6:
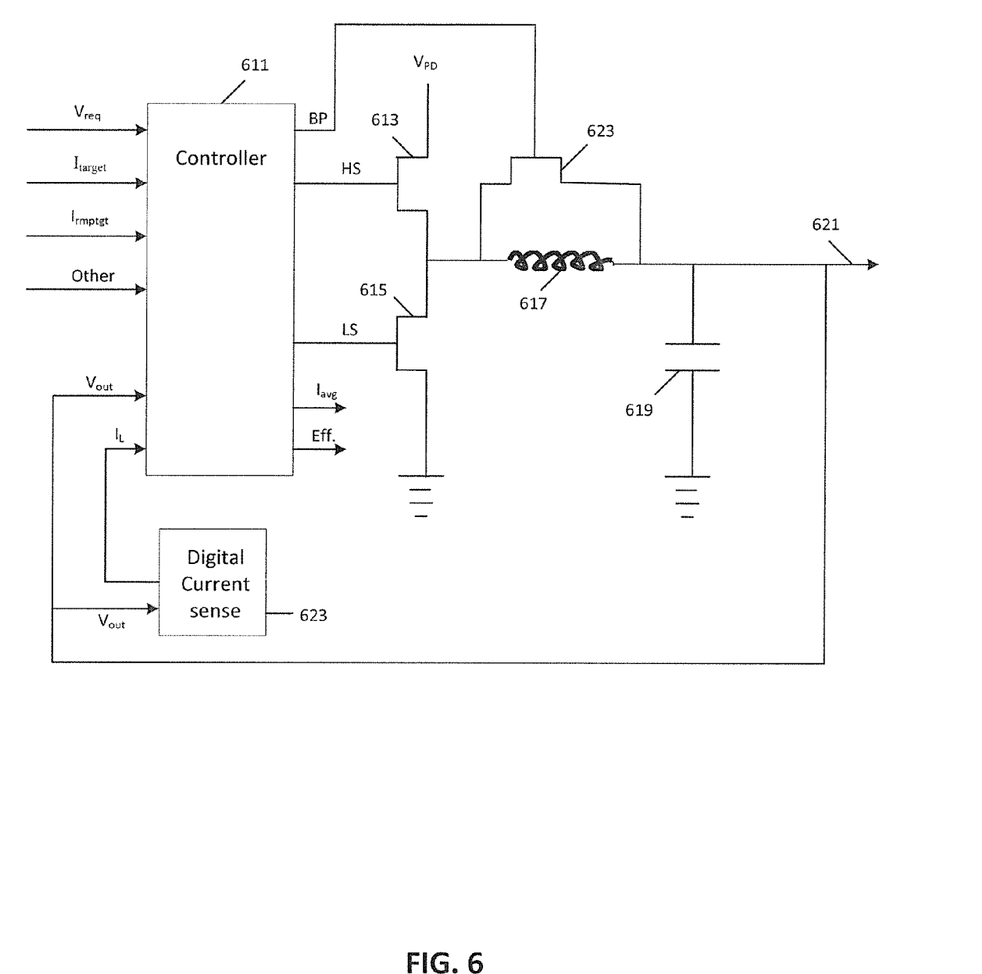
FIG. 6 is a semi-block diagram, semi-schematic of a voltage regulator in accordance with aspects of the invention.

FIG. 6 is a circuit diagram of a voltage regulator in accordance with aspects of the invention. The voltage regulator is a switching voltage regulator, and includes a controller 611 controlling operation of a high side (HS) switch 613 and a low side (LS) switch 615. The HS switch and the LS switch are connected in series between a higher voltage, generally an input power source voltage, and a lower voltage, which may be ground. A node between the HS switch and the LS switch is coupled to one end of an output inductor 617. Another end of the output inductor is coupled by way of an output line 621 to a load (not shown), with an output capacitor 619 in parallel to the load. Voltage of the output capacitor may be considered an output voltage of the voltage regulator. In some embodiments, and as shown in FIG. 6, digital current sense circuitry 623 determines current of the output inductor, based on the output voltage. In some such embodiments the digital current sense block determines current of the output inductor as discussed in U.S. patent application Ser. No. 14/593,987, entitled DC-DC Converter With Digital Current Sensing, filed Jan. 9, 2015, the disclosure of which is incorporated herein by reference.

The controller is generally configured to operate the HS and LS switches, generally such that only one is closed at any given time, to provide the output voltage in accordance with a requested output voltage. The requested output voltage may be an output voltage requested by a DVSFS governor, for example the DVFS governor of FIG. 1. In controlling the HS and LS switches to provide the requested output voltage, the controller may base operations on various signals. For example, as indicated in FIG. 6, the controller receives a feedback output voltage signal and an output inductor current signal, which for example may be generated using digital current sense circuitry 623.

In some embodiments, and as illustrated in FIG. 6, the controller additionally controls a bypass switch which couples the ends of the output inductor.

In the embodiment of FIG. 6, the controller also determines an average output current and an efficiency value for operation of the regulator. In some embodiments the controller determines the average output current by averaging the output inductor current signal. In some embodiments the averaging is performed over a predetermined period of time, for example one switching cycle of the voltage regulator or several switching cycles of the voltage regulator. In some embodiments the controller determines efficiency of the voltage regulator based on a percentage of a time period the I-IS switch is active, a percentage of a time period the LS switch is active, Vdd and the output voltage.

The voltage regulator may receive, in some embodiments, a signal indicative of a target current and a signal indicative of a target current ramp rate. In some embodiments the target current and the target current ramp rate are determined by the DVFS governor. In some embodiments, however, the voltage regulator may simply use the average current as the target current.

In some embodiments the controller includes, or has access to, a control lookup table. The control lookup table may specify aspects of controller operation, for example a controller mode, a controller switch switching regimen, or a number of active output phases (for voltage regulators providing multiple output phases). In such embodiments, the controller may use the target current information and the target current ramp rate in selecting slots of the control lookup table. In addition, in some embodiments the control lookup table may be configurable, for example by an SoC processor.

Figure 7:
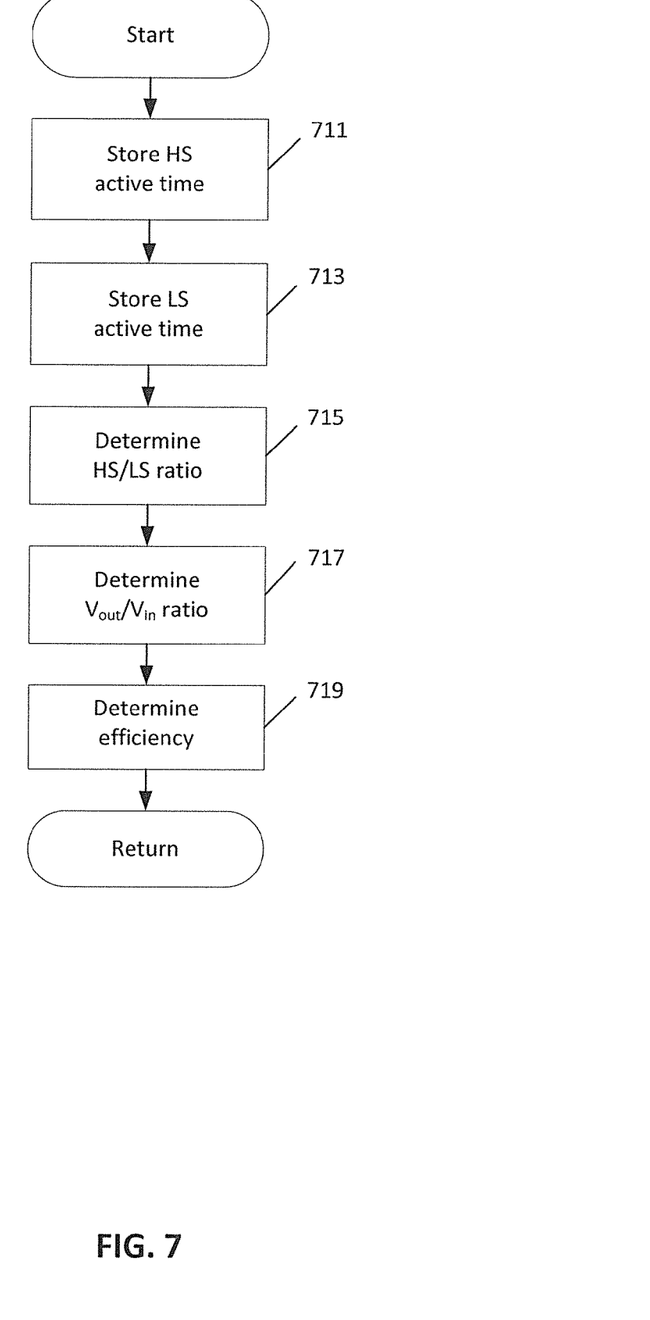
FIG. 7 is a flow diagram of a process for determining efficiency of a voltage regulator in a lossy power domain functions in accordance with aspects of the invention.

FIG. 7 is a flow diagram of a process for determining efficiency of a voltage regulator in accordance with aspects of the invention. In some embodiments the process is performed by the system of FIG. 1, or portions of the system of FIG. 1. In some embodiments the process is performed by a voltage regulator or a controller of a voltage regulator, for example as the voltage regulator of FIG. 1 or 6, or the controller of the voltage regulator of FIG. 6.

In block 711 the process stores a value indicative of time of activation of a high side (HS) switch of a switching voltage regulator. In some embodiments the time of activation of the HS switch is determined as a time for which a control signal to the high side switch is active. In some embodiments the time of activation of the HS switch is determined as a percentage of a time period of a switching cycle for which the HS switch is to be active.

In block 713 the process stores a value indicative of time of activation of a low side (LS) switch of a switching voltage regulator. In some embodiments the time of activation of the LS switch is determined as a time for which a control signal to the low side switch is active. In some embodiments the time of activation of the LS switch is determined as a percentage of a time period of a switching cycle for which the LS switch is to be active.

In block 715 the process determines a ratio of the time of activation of the HS switch and the time of activation of the LS switch. In some embodiments the ratio is already known, for example the controller may use the ratio in determining activation of the HS switch and the LS switch, in which cases operations of blocks 711 and 713 may be bypassed, for example.

In block 717 the process determines a ratio of output voltage provided by the voltage regulator and input voltage of the voltage regulator.

In block 719 the process determines efficiency of the voltage regulator. In some embodiments the efficiency of the voltage regulator is determined as discussed above with respect to other figures. In some embodiments the efficiency of the voltage regulator is determined based on the HS/LS ratio and the output voltage/input voltage ratio.

The process thereafter returns.

Figure 8:
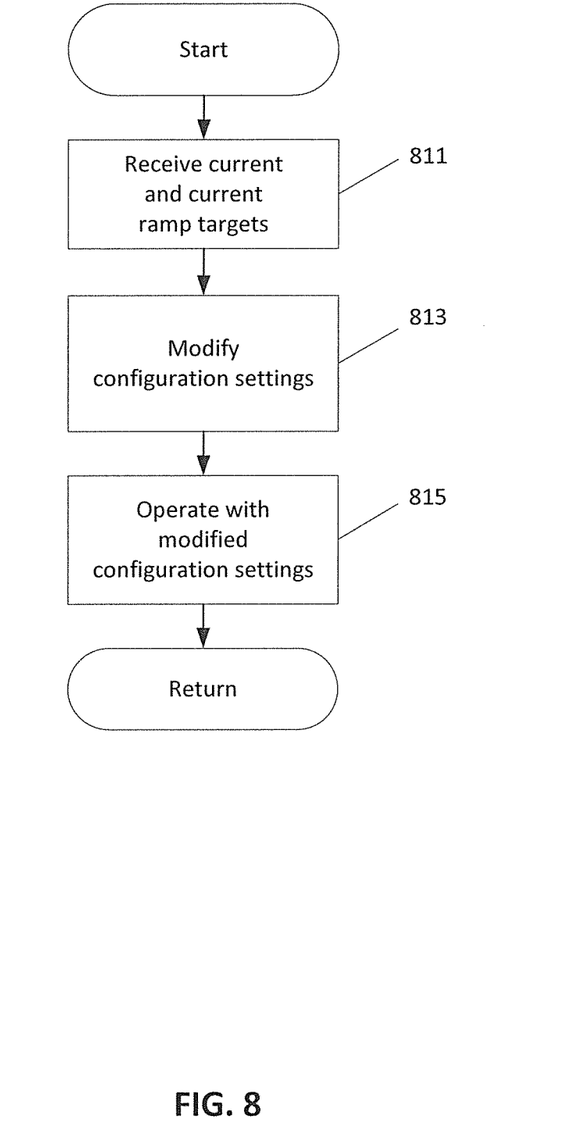
FIG. 8 is a flow diagram of a process useful in configuring a voltage regulator in accordance with aspects of the invention.

FIG. 8 is a flow diagram of a process useful in configuring a voltage regulator in accordance with aspects of the invention. In some embodiments the process is performed by the system of FIG. 1, or portions of the system of FIG. 1. In some embodiments the process is performed by a voltage regulator or a controller of a voltage regulator, for example as the voltage regulator of FIG. 1 or 6, or the controller of the voltage regulator of FIG. 6.

In block 811 the process receives a current target and a current ramp target. In some embodiments the process receives the current target and the current ramp target from a DVFS governor. In some embodiments the current target and the current ramp target are a current average and a current ramp determined by the controller of the voltage regulator.

In block 813 the process modifies configuration settings of the voltage regulator based on the current target and the current ramp target. In some embodiments the configuration settings indicate a mode of operation of the voltage regulator. In some embodiments the mode of operation may be a pulse width modulation (PWM) mode or a pulse frequency modulation (PFM) mode. In some embodiments the configuration settings indicate a number of active phases for use in multi-phase operation of the voltage regulator.

In block 815 the voltage regulator operates in accordance with the configuration settings.

The process thereafter returns.

Figure 9:
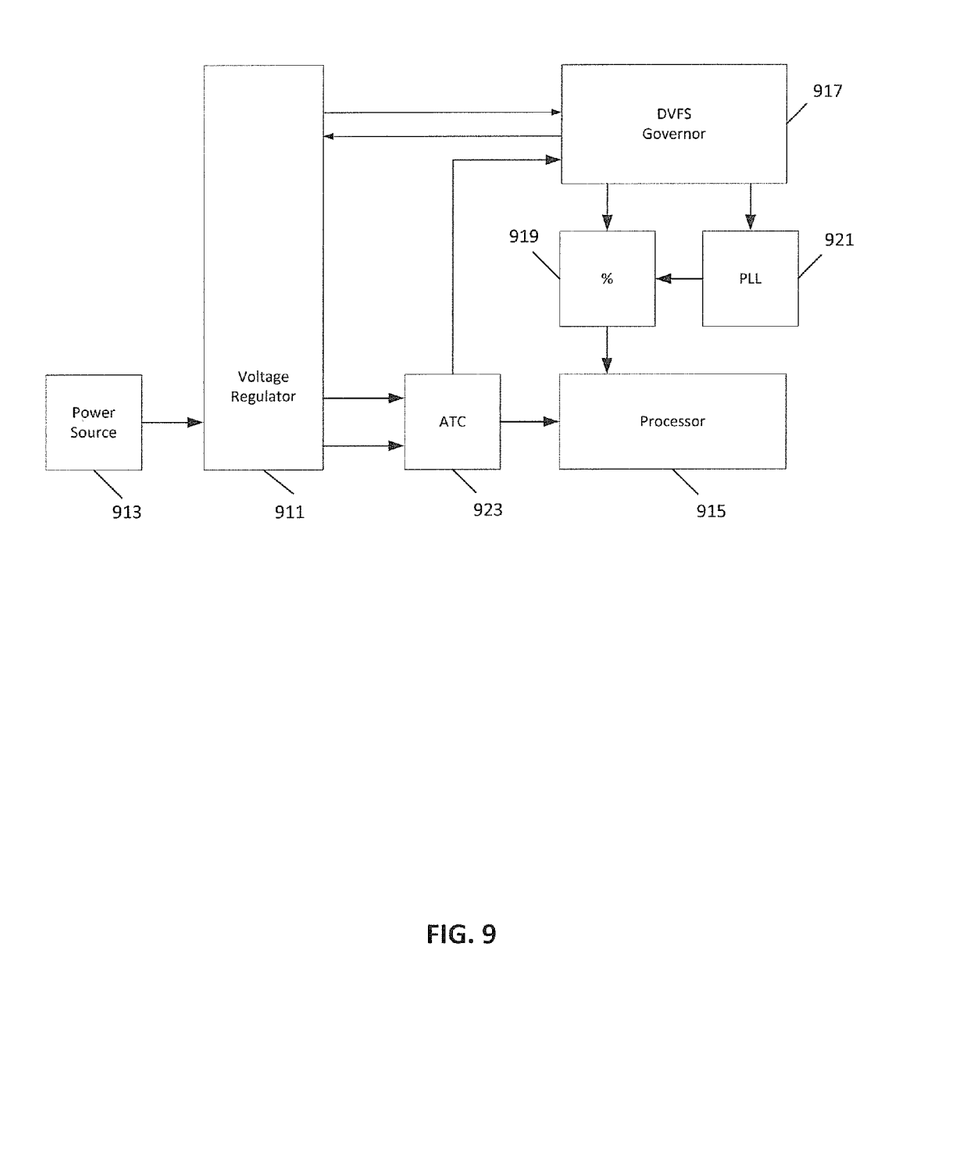
FIG. 9 is a block diagram of a further system including voltage regulation related functions in accordance with aspects of the invention.

FIG. 9 is a block diagram of a further system including voltage regulation related functions in accordance with aspects of the invention. In FIG. 9, as in FIG. 1, a voltage regulator 911 receives power from a power source 913, and supplies regulated power to a load, which is shown as a processor 915. As in the system of FIG. 1, the power source 913 may be a utility power source, but is generally a battery. In some embodiments the battery, voltage regulator, and processor are all part of one device, for example a cellular or smart telephone device or other portable computer device.

In the system of FIG. 9, an automatic transient control (ATC) circuit is interposed in the power pathway between the voltage regulator and the load, although in some embodiments the ATC circuit instead may be considered to be connected in a parallel or abutting fashion to the power pathway. The automatic transient control circuit serves to increase power provided to the load, and/or in some embodiments to decrease power available to the load, during particular power operations. In most embodiments the ATC circuit is configured to provide additional power to the load for short periods, for example less than a switching cycle of the voltage regulator, in order to reduce negative effects of transients during ramping of current provided to the load. In some embodiments the ATC circuit is the same as or in some embodiments similar to the active transient control block of U.S. patent application Ser. No. 14/602,112, entitled Transient Power Control, filed Jan. 21, 2015, the disclosure of which is incorporated herein by reference. As discussed in U.S. patent application Ser. No. 14/602,112, in some embodiments the active transient control block includes circuitry for providing power to the load from the power source, preferably in a controlled ramping manner, during predefined operational conditions. For example, in some embodiments, when the power domain requires a large increase in supplied power, the active transient control block circuit may allow, over a period of time, increasing amounts of power to be supplied from the power source to the power domain. In some embodiments this may be accomplished by providing a plurality of parallel signal paths from the power source to the power domain, each of the paths being able to pass discrete amounts of power to the power domain. The plurality of paths may be between an SOC power supply Vcc and the load. Differing numbers of paths, or different paths allowing for passage of differing amounts of power to the power domain, may be activated at different times during the period of time. The period of time may be relatively short, for example, limited to nominally a cycle of a switching power duty cycle. In some embodiments selection of which paths to activate, and in some embodiments when to activate the paths, may be made based on magnitude of voltage at an input to the power domain. In some embodiments the magnitude of the voltage may be determined by use of comparators, which preferably are relatively fast acting comparators. In some embodiments each of the paths may include an output branch coupled to the power domain and another output branch coupled to a ground. During times when any of the paths are to be activated, or may be activated, power may be passed through all of the paths, selectively either to the power domain or to the ground, or to both. Such a configuration, which may be implemented for example using current mirrors, may allow for decreased activation time when power is desired to be passed through a particular path to the power domain, and/or may provide possible reduction of voltage drops across parasitic inductances in a supply path from the power source to the active transient control block.

Figure 10:
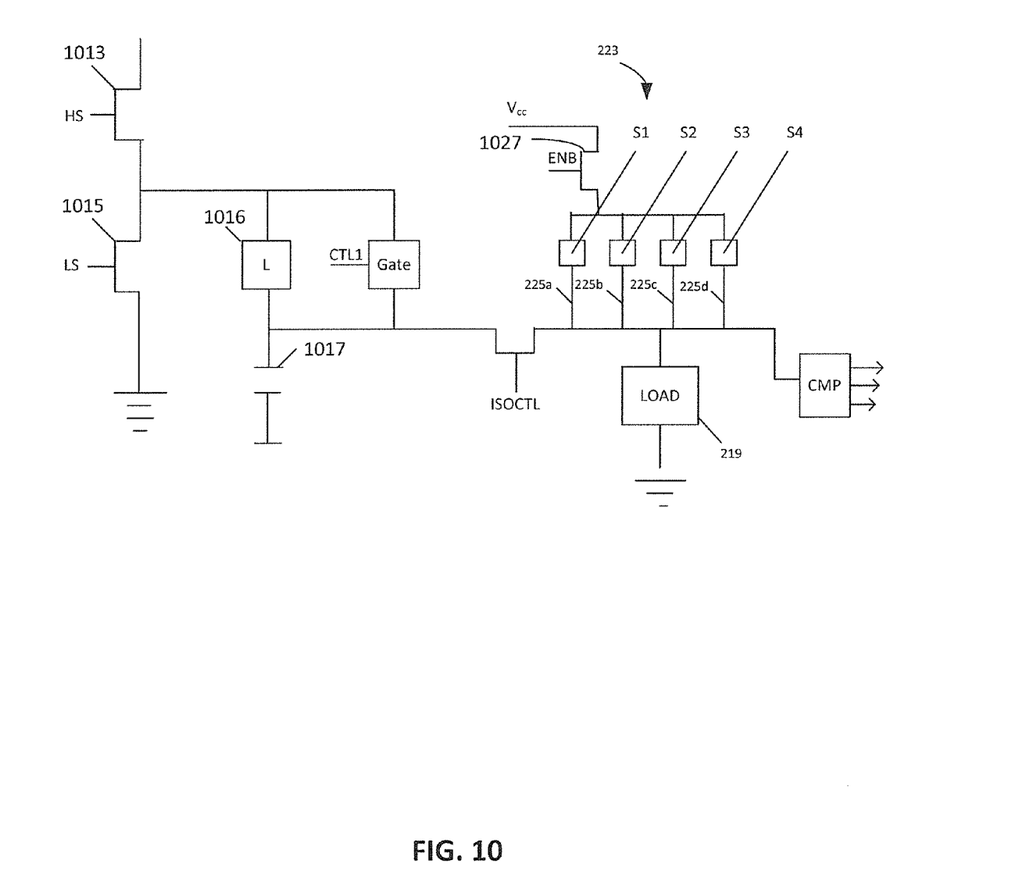
FIG. 10 is a semi-schematic, semi-block diagram showing portions of an embodiment of an active transient control block.

FIG. 10 is a semi-schematic, semi-block diagram showing portions of an embodiment of an active transient control block. For clarity, FIG. 10 also shows a high side switch 1013, low side switch 1015, inductor 1016, and capacitor 1017 of a DC-DC converter, and a load 1019. The high side switch and the low side switch are coupled in series between a power source and a ground, with the power source coupled to the high side switch and the ground coupled to the low side switch. A first node of the inductor is coupled to a node between the high side switch and the low side switch, and a second node of the inductor is coupled to a ground by way of the capacitor. The DC-DC converter supplies power from a node between the inductor and the capacitor. Depending on a type of converter used, and implementation details, one of skill in the art may recognize that other configurations may instead be used. The active transient control block includes fast start up circuitry 1023. In the embodiment of FIG. 10, the fast startup circuitry provides a plurality of paths 1025a-d between an SOC power supply Vcc and the load. In some embodiments, however, the plurality of paths 1025a-d provide paths between a line coupled to a node, the node between the high side switch and the low side switch (which may be termed an inductor switching node), and the load. With respect to the paths, each of the paths includes a switch S1-S4 for activating the path. In addition, in the embodiment of FIG. 10, an enable switch 1027 is between the SOC power supply and the paths, such that none of the paths receives power unless the enable switch is turned on. In addition to or instead of any other control of the enable switch discussed herein, in some embodiments the enable switch is maintained in an off state if a digital voltage frequency scaling governor or similar circuitry is operating the power domain at a low frequency, or a frequency below a predetermined frequency. Similarly, in some such embodiments, other or all of the ATC circuitry is maintained in an unpowered state in such a situation.

Power consumption by the processor is modulated by a dynamic voltage and frequency scaling (DVFS) governor 917. The DVFS governor, responsive to or in view of various conditions, may request, or in some embodiments command, the voltage regulator to provide power to the processor at lower voltage levels, and may reduce (or increase) frequency of clock signals governing frequency of operations performed by the processor. The DVFS governor may, for example, command a phase-locked loop (PLL) or oscillator 921, which may be a voltage controlled oscillator (VCO), to provide clock signals at a lower frequency, or similarly command a clock divider 919, receiving clock signals from the PLL or oscillator, to use a different divisor in dividing clock signals supplied by the PLL or oscillator.

The voltage regulator may provide the DVFS governor an indication of average current supplied by the voltage regulator and an indication of efficiency of the voltage regulator, to assist the DVFS governor in determining voltage requests and/or clock frequency commands. In addition, the ATC may provide the DVFS governor an indication of when the ATC is activated, a number of activations and an indication of the average magnitude of activations, and/or in some embodiments an indication of magnitude of activations, with for example the DVFS governor being configured to determine average magnitude of activations based on the magnitude of activating information. Similarly, and as mentioned with respect to FIG. 6, the DVFS governor may provide the voltage regulator an output current target and a current ramp rate target, which the voltage regulator may use in determining operation of the voltage regulator.

In this regard, the voltage regulator may use the information provided by the DVFS governor to adjust operations of the ATC circuit. For example, in some embodiments the voltage regulator may disable the ATC circuit, for example if the target ramp rate is sufficiently low that transients would not be expected to unduly impact system operation. In such instances, the voltage regulator may be configured to disable, or command disablement, of the ATC circuit if the current ramp rate is below a predetermined value. Similarly, the ATC circuit may provide different amounts of additional power to the load based on differences between commanded voltage to be applied to the load and actual voltage applied to the load. In such instances, depending on for example a target current value, reference voltage values to be used in determining extent of additional power to be provided to the load may be varied.

In addition or instead, the DVFS governor can use run-time information from ATC for example information relating to activation of the ATC, to reduce the frequency for 'bursty' applications that would have caused larger energy overhead otherwise. For example the DVFS governor may reduce the frequency of the clock signal used by the load for operations. In addition, the DVFS governor, in some embodiments, may provide information to other device components to indicate extent of ATC activations, so as to allow the other device components to modify device operations in a manner expected to reduce extent of ATC activations. In addition, the DVFS governor may request or command on-the-fly configuration changes in other parts of the device to reduce extent of ATC activations, or in some embodiments the DVFS governor may randomly or pseudo-randomly change device-specific parameters until burstiness is reduced. In some embodiments the DVFS governor may include processing logic that executes a plurality of tasks in a sequential and/or scheduled order. In some such embodiments the DVFS governor may introduce a delay, or adjust a delay, between execution of the tasks in a pseudo-random manner. In some embodiments the DVFS governor may perform such action if a task receiving indications of ATC activations indicates that ATC activations are occurring at a greater frequency than a predefined frequency.

Although the invention has been discussed with respect to various embodiments, it should be recognized that the invention comprises the novel and non-obvious claims supported by this disclosure.

What is claimed is:

1. A system useful in provision of power to integrated circuitry forming a load, comprising:
   a voltage regulator configured to receive power from a power source and provide regulated power to a load in accordance with a requested voltage level, the voltage regulator including circuitry for determining a signal indicative of average current supplied by the voltage regulator;
   an automatic transient control (ATC) circuit connected to the load in parallel with the voltage regulator, and the ATC circuit providing a plurality of paths between the power source and the load, the ATC circuit configured to provide power to the load for short periods so as to increase power provided to the load, the ATC circuit including circuitry for providing a signal indicative of a number of ATC activations;
   a dynamic voltage and frequency scaling (DVFS) governor configured to determine the requested voltage level to be applied to the load and a frequency of a clock signal to be used by circuitry of the load, the DVFS governor configured to adjust at least one of the requested voltage level to be applied to the load and the frequency of the clock signal to be used by circuitry of the load based on the signal indicative of the number of ATC activations.

2. The system of claim 1, wherein the ATC circuit further includes circuitry for providing a signal indicative of average magnitude of ATC activations.

3. The system of claim 2, wherein the DVFS governor is configured to reduce the frequency of the clock signal to be used by circuitry of the load when the average magnitude of ATC activations exceeds a predefined magnitude.

4. The system of claim 2, wherein the DVFS governor is configured to reduce the requested voltage to be applied to the load when the average magnitude of ATC activations exceeds a predefined magnitude.

5. The system of claim 2, wherein the DVFS governor is configured to reduce the average magnitude of ATC activations based on the signal indicative of average magnitude of ATC activations.

6. The system of claim 2, wherein the DVFS governor is configured to reduce the frequency of the clock signal to be used by circuitry of the load, the reduction of the frequency of the clock signal is for reducing the average magnitude of ATC activations.

7. The system of claim 2, wherein the DVFS governor is configured to reduce the voltage to be applied to the load, the reduction of the voltage to be applied to the load is for reducing the average magnitude of ATC activations.

8. The system of claim 1, wherein the DVFS governor is configured to reduce the frequency of the clock signal to be used by circuitry of the load when the number of ATC activations exceeds a predefined value.

9. The system of claim 1, wherein the DVFS governor is configured to reduce the voltage to be applied to the load when the number of ATC activations exceeds a predefined value.

10. The system of claim 1, wherein the DVFS governor is configured to reduce the number of ATC activations based on the signal indicative of number of ATC activations.

11. The system of claim 1, wherein the DVFS governor is configured to reduce the frequency of the clock signal to be used by circuitry of the load, the reduction of the frequency of the clock signal is for reducing the number of ATC activations.

12. The system of claim 1, wherein the DVFS governor is configured to reduce the voltage to be applied to the load, the reduction of the voltage to be applied to the load is for reducing the number of ATC activations.

13. The system of claim 1, wherein the DVFS governor is further configured to provide a signal indicative of a current ramp rate target to the voltage regulator.

14. The system of claim 13, wherein the voltage regulator is configured to command disablement of the ATC circuit based on the signal indicative of the current ramp rate target.

15. The system of claim 13, wherein the voltage regulator is configured to command disablement of the ATC circuit when the current ramp rate target is below a predetermined value.

\* \* \* \* \*